United States Patent

Ellis

[11] Patent Number: 5,641,067
[45] Date of Patent: Jun. 24, 1997

[54] RETRACTABLE SPEAKER WIRE

[76] Inventor: David A. Ellis, 18234 Gary Rd., Dade City, Fla. 33525

[21] Appl. No.: 520,593

[22] Filed: Aug. 30, 1995

[51] Int. Cl.⁶ .................................................. B65D 73/00
[52] U.S. Cl. ................ 206/409; 206/415; 174/DIG. 9; 242/588.6; 439/4
[58] Field of Search ................... 206/389, 395–397, 206/403–405, 408, 409, 413–416; 174/69, 135, DIG. 9; 242/96, 170–171, 128–129, 588.3, 588.6; 439/501, 4

[56] References Cited

U.S. PATENT DOCUMENTS

| | | | |
|---|---|---|---|
| 2,084,953 | 6/1937 | Gibson | 439/501 |
| 4,282,954 | 8/1981 | Hill | 439/501 |
| 4,338,497 | 7/1982 | Drew | 439/4 |
| 4,378,473 | 3/1983 | Noorigian | 439/4 |
| 4,653,833 | 3/1987 | Czubernat et al. | 439/501 |
| 5,103,977 | 4/1992 | Douglas | 206/388 |
| 5,236,371 | 8/1993 | Matthis | 439/501 |
| 5,344,339 | 9/1994 | Cheslock | 439/501 |

*Primary Examiner*—Paul T. Sewell
*Assistant Examiner*—Luan K. Bui
*Attorney, Agent, or Firm*—Dorothy . S. Morse, Esq.; American Innovations, Inc.

[57] ABSTRACT

A housing device for the retractable storage of a wire, cord or cable which is capable of operationally interconnecting electronic equipment, such as portable speakers and radios, while the interiorly coiled end of the wire, cord or cable remains coiled around a rotatable spool during connection. In its preferred embodiment, the housing device has a cover with connection ports therethrough. A radio connected to the connection ports becomes operationally connected with the interiorly coiled end of the wire, cord or cable through electrically conductive means integral with the spring-driven spool. The outer end of the coiled wire is then extended through an opening in the housing cover and connected to a portable speaker. The opening in the housing would be just large enough to accommodate the wire. A device larger in diameter than the wire would be attached at the near end of the exposed wire to prevent it from retracting all the way back inside the housing. After disconnection from the speaker, a light tug on the outer end of the coiled wire engages the spring-activated spool to retract the outer end back into the housing.

4 Claims, 3 Drawing Sheets

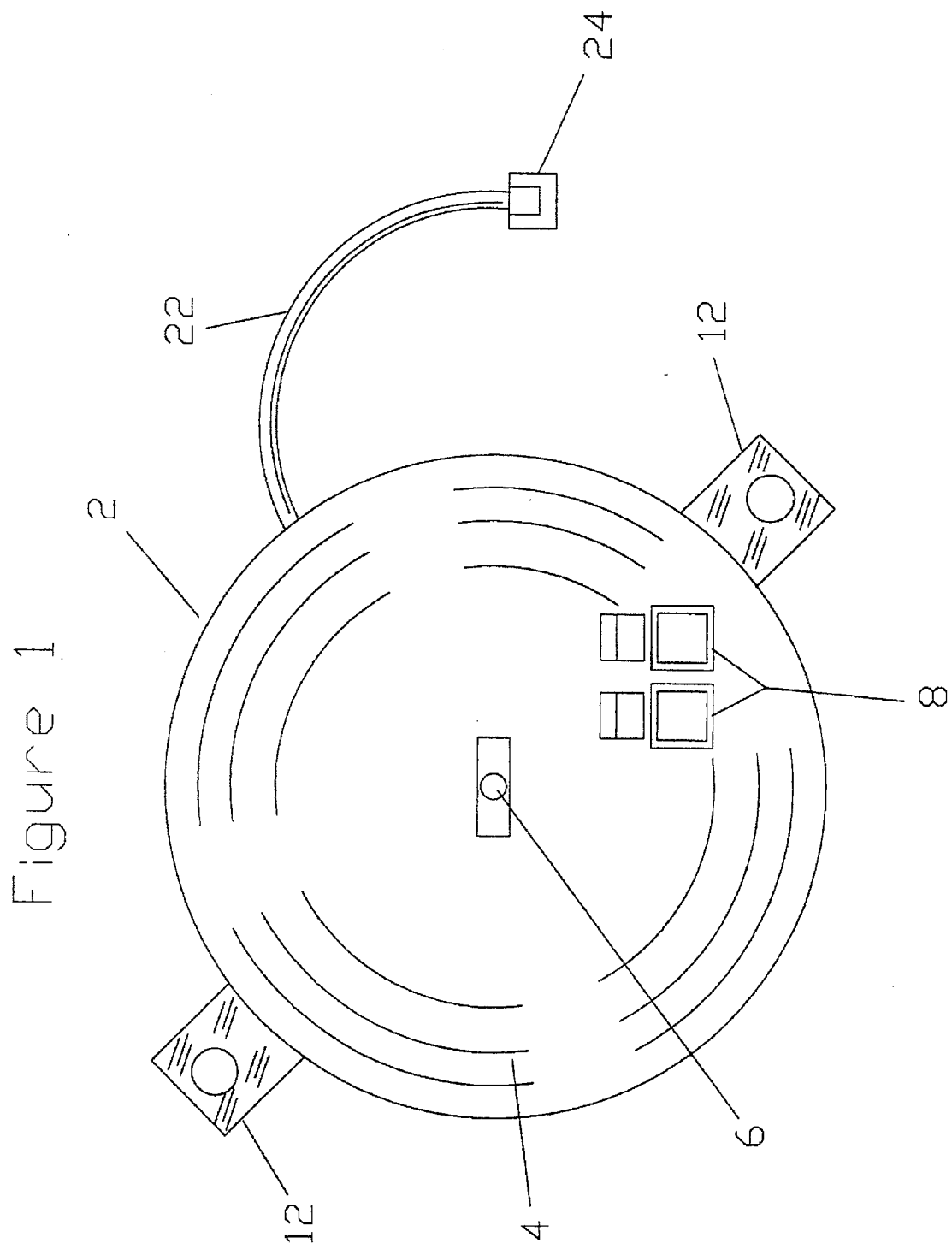

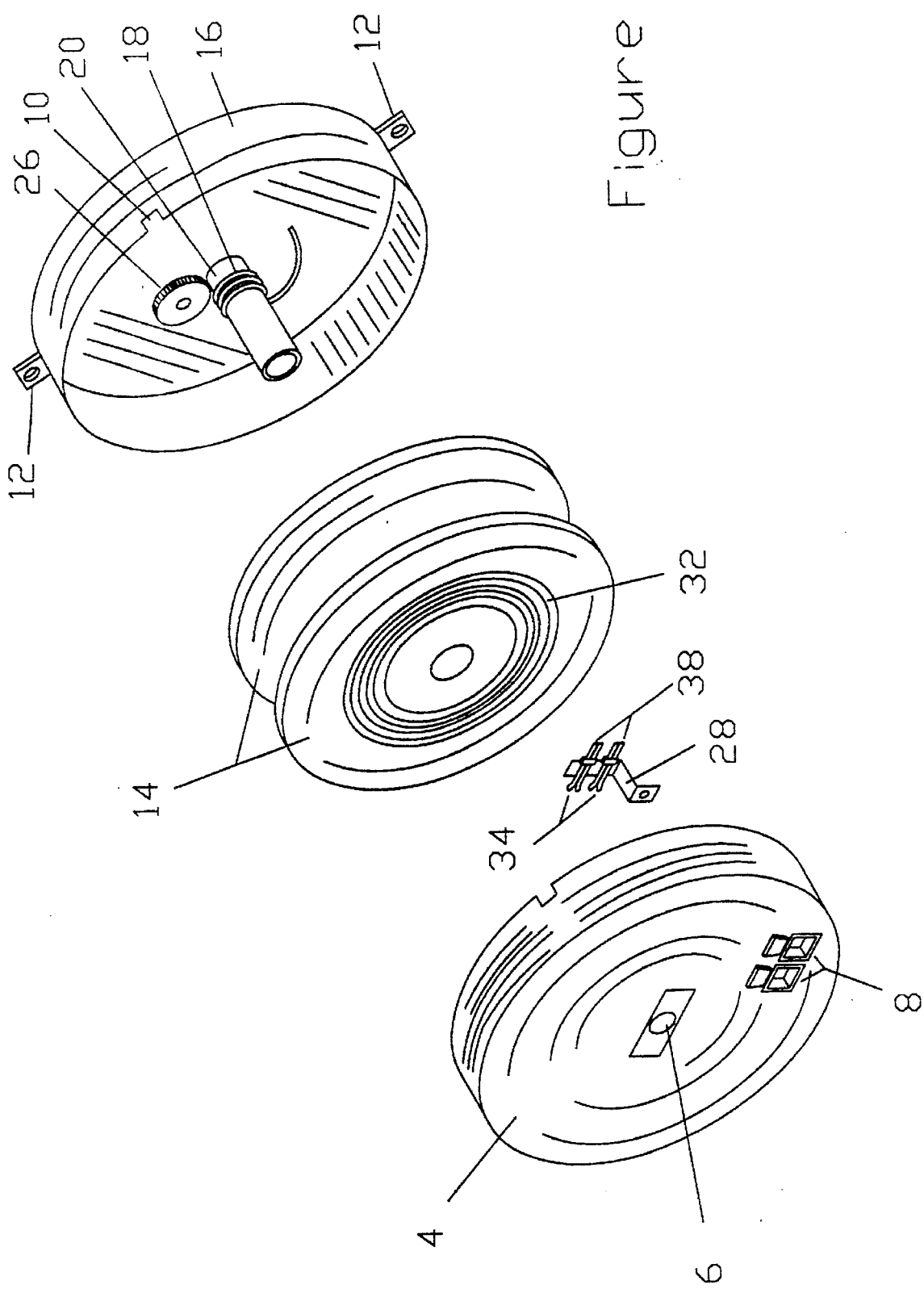

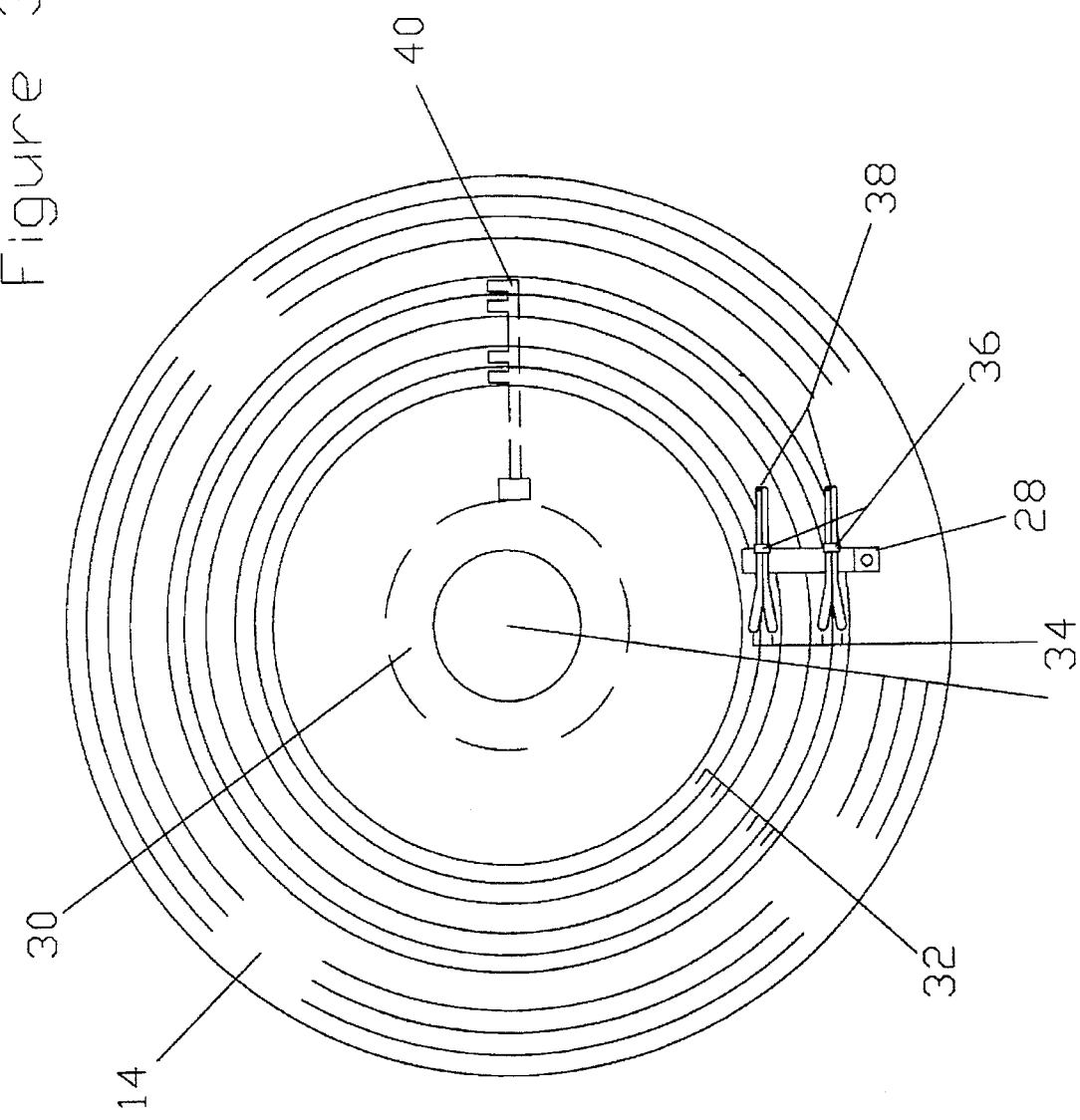

RETRACTABLE SPEAKER WIRE

BACKGROUND—FIELD OF INVENTION

This invention relates to devices for housing electrical wires, cords and cables, specifically to a housing device for electrical connection of a portable speaker to a radio, compact disk player or tape player in which a spring-driven spool is rotatable within a cover and in which the outer end of a wire coiled about the spool is available for electrical connection to the speaker by extension through an opening in the cover while the other end of the wire remains interiorly coiled about the spool, but available for electrical connection, via electrically conductive means integral with the spool, to the radio, compact disk player or tape player attached to connection ports in the cover.

BACKGROUND—DESCRIPTION OF PRIOR ART

It is known in the field of housing devices to have spools of varying sizes and shapes about which are wrapped a wide variety of materials, including wire, cord, cables, rope, string, thread, ribbon, photographic film and tubing. Usually, prior to wrapping, one end of the material is attached to, or placed adjacent to, the spool where it becomes interiorly coiled and inaccessible until the entire length of material is unwrapped from the spool. Should the spool contain an opening in its side, prior to wrapping, the end of the material that would ordinarily become interiorly coiled could be made to extend through the opening and be accessible without unwrapping the remainder of the material from the spool. However, having the interiorly coiled end of the material extending outside of the spool makes it subject to tangling and damage. In addition, the spool may not be conveniently or compactly stored when the interiorly coiled end extends outside the spool, nor is such a spool as neat in appearance.

It is also known in the field of housing devices to have spring-driven apparatus which house commonly used items such as clotheslines and dog leashes. Each item may be withdrawn from its respective housing for use, and when no longer needed, each is automatically returned to its respective housing. The disadvantage of using these devices to house a wire needed for electrical connection is that the interiorly coiled end of the wire would be inaccessible for connection.

Both ends of a cord remain exposed and available for electrical connection when reeled onto the inventions disclosed in the following two U.S. Patents since each invention causes a center portion of the cord to become interiorly coiled. U.S. Pat. No. 2,952,420 to Von Hoorn (1960) discloses a take-up reel adapted to store excess lengths of cords, such as appliance cords, to minimize the hazard of people tripping over them. The Von Hoorn reel has a central divider to maintain the coils from the two ends of the cords separate from each other. U.S. Pat. No. 1,692,517 to Replogle (1923) discloses a similar device for housing cords which uses a central spool flange with a slitted periphery to accommodate a loop made in the middle of a cord. Once the loop is attached to the central spool flange, rotation of the spool winds the cord around the spool so that each half of the cord becomes spirally wound around opposite sides of the central spool flange. The Replogle invention also discloses a central opening to allow quick, manual unwinding of the cord.

While the simultaneous winding and unwinding of both ends of a cord provided by the two above-mentioned patented devices is an advantage in some applications, it turns into a disadvantage in other applications. For example, if either patented invention were used in the electrical connection of components of a vehicle sound system, when one of the speakers is temporarily removed from the vehicle to protect it from theft, both the cord to the speaker and the cord to the radio, compact disk player or tape player would retract simultaneously. In this situation it would be desirable to retract only the end of the cord disconnected from the speaker. In other applications, it also may be desirable to selectively extend or retract the length of one end of the cord without altering the exposed length of its other end. Therefore, at some point during the use of either the Von Hoorn or the Replogle invention, an excess in the length of one of the ends of the cord would most likely occur, the excess length being subject to tangling and damage. The excess length also having the potential to cause a nuisance or hazardous situation.

It is not known in this field to have a housing device for a wire, with a spring-driven spool rotatable within a cover, in which the outer end of a wire coiled about the spool is available for electrical connection by extension through an opening in the cover and the other end of the wire remains interiorly coiled about the spool, but available for electrical connection through ports in the cover and electrically conductive means integral with the spool.

SUMMARY OF INVENTION—OBJECTS AND ADVANTAGES

It is the primary object of this invention to provide a housing device for the retractable storage of a wires, cords and cables which allows for electrical connection of the interiorly coiled end of the wire, cord or cable. It is also an object of this invention to provide a housing device for a wire connecting two electronic components which will allow the selective extension and retraction of the wire of one of those components. It is also an object of this invention to provide a housing device for protecting a wire from tangling and damage when not extended fully for use. It is a further object of this invention to provide a housing device that makes the connection of wires, cords and cables to electronic equipment fast, straightforward and trouble-free. It is also an object of the present invention to provide a housing device that is lightweight, attractive and convenient to use.

As described herein, properly manufactured and installed, the present invention would provide a convenient means for neatly storing wires and protecting them from damage when not fully extended for use. One contemplated use for the present invention is for connecting portable speakers and other valuable portable electronic equipment which are commonly removed from trucks, automobiles and other vehicles, after use, to protect them from theft. After disconnection, speaker wires may be left loose inside the vehicle where they are unattractive, are subject to tangling and damage, and create a potential hazard to people using the vehicle. Manual coiling of the disconnected wires is time consuming and has nonuniform results. The present invention provides a device to house such speaker wires until they are again needed for connection. The present invention also allows for fast and trouble-free electrical connection between pieces of electronic equipment. The outer end of the speaker wire housed in the present invention is immediately available for connection to a speaker with a light tug on the speaker wire to uncoil it from the spool. A second electronic device may be indirectly connected to the interiorly coiled end of the speaker wire through connection to radio wire ports located on the outside of the invention cover. A secondary advantage of the present invention is that it is compact, lightweight and easy to use.

The description herein provides preferred embodiments of the present invention but should not be construed as limiting the scope of the retractable speaker wire invention. For example, variations in the size and shape of the housing and spool, the connection means between the front and rear outer covers, the driving means for the retraction process and the size and shape of the mounting brackets, other than those shown, can be incorporated into the present invention. Thus the scope of the present invention should be determined by the appended claims and their legal equivalents, rather than the examples given.

BRIEF DESCRIPTION OF THE DRAWINGS

FIG. 1 is a front view of the retractable speaker wire invention.

FIG. 2 is an exploded elevational view of the retractable speaker wire invention.

FIG. 3 is a front view of the spool component of the retractable speaker wire invention.

DETAILED DESCRIPTION OF PREFERRED EMBODIMENTS

FIGS. 1 and 2 show the preferred embodiment of the retractable speaker wire invention 2 having a front cover 4 and a rear cover 16, each capable of being attached to the other with an axial connector 6. In the preferred embodiment a speaker wire opening 10 is formed between front cover 4 and rear cover 16 through which a speaker wire 22 may extend. A speaker wire connector 24, which is slightly larger than the diameter of speaker wire 22, is attached to the exposed end of speaker wire 22 to prevent it from retracting beyond speaker wire opening 10. In the preferred embodiment, front cover 4 also has radio wire ports 8 and rear cover 16 has mounting brackets 12 attached thereto for placing retractable speaker wire invention 2 in a fixed position for convenient use. Radio wire ports 8 may be closable when not in use to prevent dust and debris from entering the interior of retractable speaker wire invention 2.

Housed between front cover 4 and rear cover 16 is a spool 14. When retracted for storage, speaker wire 22 is wrapped about spool 14. Spool 14 is positioned on a spool axle 20 which is attached to, or molded with, rear cover 16. Adjacent to spool axle 20 are a tension control mechanism 26 and a recoil mechanism 18. Electrically conductive tape 32 is attached to the side of spool 14 facing front cover 4. Mounted to front cover 4 and positioned behind radio wire ports 8 is a brush support 28. Attached to brush support 28 are electrically conductive brushes 34 and an electrically conductive wire 38.

FIG. 3 shows spool 14 having a central shaft 30 through which spool axle 20 is inserted. FIG. 3 also shows electrically conductive tape 32 positioned on spool 14. Brush support 28 is situated so that electrically conductive brushes 34 are in constant contact with electrically conductive tape 32, even as spool 14 is rotated. On the opposite side of electrically conductive tape 32, and in contact therewith, connector 40 electrically connects electrically conductive tape 32 with the interiorly coiled end of speaker wire 22.

When retractable speaker wire invention 2 is in use, speaker wire 22 is extended from speaker wire opening 10 so that speaker wire connector 24 may be electrically connected to a speaker (not shown). Tension control mechanism 26 allows slack in speaker wire 22 so that speaker wire 22 is not always urged to retract. Wires from a radio (not shown) are connected to radio wire ports 8. Electrical connection between radio wires (not shown) and the interiorly coiled end of speaker wire 22 is accomplished through the successive connection of radio wire ports 8, to electrically conductive wire 38, to electrically conductive brushes 34, to electrically conductive tape 32, to connector 40 and finally to the interiorly coiled end of speaker wire 22. When speaker wire 22 is disconnected from a speaker (not shown) and ready for storage, a slight tug on speaker wire 22 releases tension control mechanism 26 to allow recoil mechanism 18 to draw speaker wire 22 around spool 14 in a quick, neat and orderly manner. Speaker wire 22, housed on spool 14 between front cover 4 and rear cover 16, is now protected from tangling and damage until again needed for connection to speakers (not shown).

Although it is contemplated in the preferred embodiment of the present invention for electrically conductive tape 32 be made out of copper, any material providing good electrical connection is acceptable as long as it also is able to withstand, without excessive deterioration, the constant contact with electrically conductive brushes 34. Electrically conductive tape 32 may be attached to spool 14 or made integral therewith. Also, the size and shape of electrically conductive brushes 34 is not critical, as long as good electrical contact with electrically conductive tape 32 is accomplished.

Although in the preferred embodiment, retractable speaker wire invention 2 should be compact in size, in different applications front cover 4, rear cover 16 and spool 14 may have varying sizes and shapes, as long as rotation of spool 14 is not restricted. In the preferred embodiment, it is contemplated for spool 14 to hold approximately fifty to one hundred feet of speaker wire 22. Also, even though it is preferred for front cover 4 and rear cover 16 to be connected by axial connector 6, such connection is not critical. Any connection means is possible which allows front cover 4 and rear cover 16 to form a hollow interior and which allows rotation of spool 14 therein. Front cover 4 and rear cover 16 should be made of a strong, durable material, such as an impact-resistant plastic. It is also preferred that the material be lightweight for ease in mounting. Although the preferred embodiment shows two mounting brackets 12, the size, shape and number of mounting brackets 12 is not critical, as long as they are adequate to support the weight of retractable speaker wire invention 2 and securely attach it to a fixed location.

In addition to spring-driven retraction means, it is also contemplated for the present invention to have manual, crank-driven or motor-driven retraction means. It is also contemplated that speaker wire connector 24 and the radio wires (not shown) to be received by radio wire ports 8 have connecting means commonly used for electronic equipment. Further, it is contemplated for the distance between radio wire ports 8 and electrically conductive tape 32 to be minimal for minimum interference in the electrical connection. It is also contemplated for speaker wire 22 to be of a gauge commonly used for connection of electronic system components and which permits those components to perform at their optimum.

What is claimed is:

1. A housing device for storing a length of flexible, electrically conductive wire having an interiorly coiled end and an outer end, said housing device comprising a cover having a hollow interior, a spool about which said electrically conductive wire can be coiled, said spool being rotatable within said hollow interior, an opening through said cover, a plurality of connection ports in said cover, and means to operationally connect said interiorly coiled end to each of said connection ports so that at least two pieces of electronic equipment can be operationally interconnected through use of said housing device by attachment of a first of said pieces of said electronic equipment to said outer end of said electrically conductive wire and other pieces of said electronic equipment to at least one of said connection ports, with said coiled end of said spool remaining coiled around said spool during connection and a sufficient amount of said electrically conductive wire moving through said opening in said cover to allow connection of said outer end with said first piece of electronic equipment, and wherein said means to operationally connect comprises a quantity of electrically conductive tape integral with said spool.

2. The housing device of claim 1 further comprising a plurality of electrically conductive brushes operationally connected to said electrically conductive tape.

3. A housing device for storing a quantity of flexible, elongated electrically conductive wire having an interiorly coiled end and an outer end, said housing device comprising, a cover having a front portion and a rear portion, means to connect said front cover to said rear cover to provide a hollow interior, a spool about which said wire can be coiled, said spool having a front side facing said front portion, said spool being rotatable within said hollow interior, an opening through said cover between said front portion and said rear portion, a plurality of connection ports extending through said front portion, a quantity of electrically conductive tape integral with said front side of said spool, a plurality of electrically conductive brushes in contact with said tape, a quantity of electrically conductive noncoiled wire connecting each of said connection ports to said brushes, and an electrically conductive connector connected between said interiorly coiled end and said tape so that electronic components can be operationally connected by said housing device without having to uncoil said interiorly coiled end from said spool to accomplish connection.

4. A method for connecting a speaker to other electronic equipment comprising the steps of providing a speaker, a piece of electronic equipment, a speaker wire having two opposite ends, an electronic equipment wire, a spool, a cover having a hollow interior, an opening and a plurality of connection ports therethrough, a quantity of electrically conductive noncoiled wire, a plurality of electrically conductive brushes, a quantity of electrically conductive tape, and a connector; attaching said tape to said spool; attaching said brushes to said cover; electrically connecting said brushes to said connection ports with said noncoiled wire; wrapping said speaker wire around said spool so that one of said ends becomes interiorly coiled; attaching said connector to said interiorly coiled end of said speaker wire; placing said spool within said hollow interior so that said tape is in electrical contact with said brushes; connecting said connector to said tape; threading the other of said opposite ends of said speaker wire through said opening in said cover so that it is exposed for connection; connecting said exposed end of said speaker wire to said speaker; and using said electronic equipment wire to connect said piece of electronic equipment to said connection ports so that electrical connection is made between said speaker and said piece of electronic equipment without having to uncoil said interiorly coiled end of said speaker wire to accomplish connection.

\* \* \* \* \*